(12) United States Patent
Wong

(10) Patent No.: US 10,133,316 B1
(45) Date of Patent: Nov. 20, 2018

(54) BINOCULAR HEAD-MOUNTED DEVICE WITH INTERPUPILLARY DISTANCE ADJUSTMENT MECHANISMS

(71) Applicant: Syndiant Inc., Dallas, TX (US)

(72) Inventor: Chun Chiu Daniel Wong, Palo Alto, CA (US)

(73) Assignee: SYNDIANT INC., Dallas, TX (US)

( * ) Notice: Subject to any disclaimer, the term of this patent is extended or adjusted under 35 U.S.C. 154(b) by 0 days.

(21) Appl. No.: 15/947,965

(22) Filed: Apr. 9, 2018

(30) Foreign Application Priority Data

May 18, 2017 (TW) .............................. 106116499 A

(51) Int. Cl.
H05K 7/20 (2006.01)
H05K 5/00 (2006.01)
G06F 1/16 (2006.01)

(52) U.S. Cl.
CPC ............ G06F 1/1679 (2013.01); G06F 1/163 (2013.01)

(58) Field of Classification Search
CPC ....................................................... H05K 5/00
See application file for complete search history.

(56) References Cited

U.S. PATENT DOCUMENTS

2016/0255748 A1* 9/2016 Kim .................. H05K 7/20972
361/695

* cited by examiner

Primary Examiner — Jerry Wu
(74) Attorney, Agent, or Firm — McClure, Qualey & Rodack, LLP

(57) ABSTRACT

A binocular head-mounted device with interpupillary distance adjustment mechanisms is provided in the present invention, which comprises a visual frame, two display modules and two interpupillary distance adjustment mechanisms. The two display modules are disposed at a left side and a right side of the visual frame respectively. Each of the two interpupillary distance adjustment mechanisms is disposed on one of the display modules and on the visual frame and has a snap-fit portion and a positioning structure corresponding thereto. The positioning structure has a plurality of positioning recesses arranged horizontally in a first direction, and the plurality of positioning recesses can be snap-fitted with the snap-fit portion so that the display module is moved parallel to the first direction and then positioned.

13 Claims, 6 Drawing Sheets

BINOCULAR HEAD-MOUNTED DEVICE WITH INTERPUPILLARY DISTANCE ADJUSTMENT MECHANISMS

CROSS-REFERENCE TO RELATED APPLICATIONS

This application claims priority to Taiwan Patent Application No. 106116499 filed on May 18, 2017.

BACKGROUND OF THE INVENTION

Field of the Invention

The present invention relates to a binocular head-mounted device, and particularly, to a binocular head-mounted device with interpupillary distance adjustment mechanisms.

Descriptions of the Related Art

With emergence of the augmented reality and the virtual reality in recent years, more and more people have a demand for wearing a see-through or an immersive head-mounted device which can project an image to two eyes via a display module. To satisfy demands of users having different interpupillary distances, a kind of binocular head-mounted device with interpupillary distance adjustment mechanisms has also been developed in the industry.

For example, a head-mounted device has been disclosed in China Patent No. CN204832689U. This head-mounted device has a rotary structure to adjust the distance between two lens pieces, and the rotary structure comprises a gear and two racks. However, such a device has the left lens piece and the right lens piece adjusted simultaneously, so it is unsuitable for users whose two eyes are asymmetrical; and moreover, the central rotary structure has a bulky volume.

SUMMARY OF THE INVENTION

The primary objective of the present invention is to provide a binocular head-mounted device with interpupillary distance adjustment mechanisms, wherein positioning structures are utilized to force snap-fit portions to swing. Therefore the display modules corresponding to the left eye and the right eye respectively can be adjusted individually, so that the display modules corresponding to the left eye and the right eyes respectively can be moved independently in the horizontal direction to facilitate use by users whose two eyes are asymmetrical. Besides, in practical use, positions of the display modules can be adjusted directly by simply applying a small force without having to additionally opening or closing other releasing mechanisms. Therefore, the binocular head-mounted device is simpler in structure and time-saving in use.

To achieve the aforesaid objective, a binocular head-mounted device with interpupillary distance adjustment mechanisms is provided, which comprises: a visual frame; two display modules, disposed at a left side and a right side of the visual frame respectively; and two interpupillary distance adjustment mechanisms, each of interpupillary distance adjustment mechanisms is disposed on one of the display modules and on the visual frame, and each of interpupillary distance adjustment mechanisms has a snap-fit portion and a positioning structure corresponding thereto, the positioning structure has a plurality of positioning recesses arranged horizontally in a first direction; wherein when either of the display modules moves parallel to the first direction, the corresponding positioning structure forces the corresponding snap-fit portion to move up and down, and when the display modules stops, the snap-fit portion is snap-fitted into one of the positioning recesses.

DESCRIPTION OF THE PREFERRED EMBODIMENT

Hereinbelow, possible implementations of the present invention will be described with reference to embodiments thereof. It shall be illustrated that, the terms such as "up", "down", "left", "right", "horizontal", "vertical", . . . , or the like as used herein are intended to illustrate relationships among different features when the head-mounted device is normally worn on the user' head, but not to limit the scope of the present invention.

Figure 1:
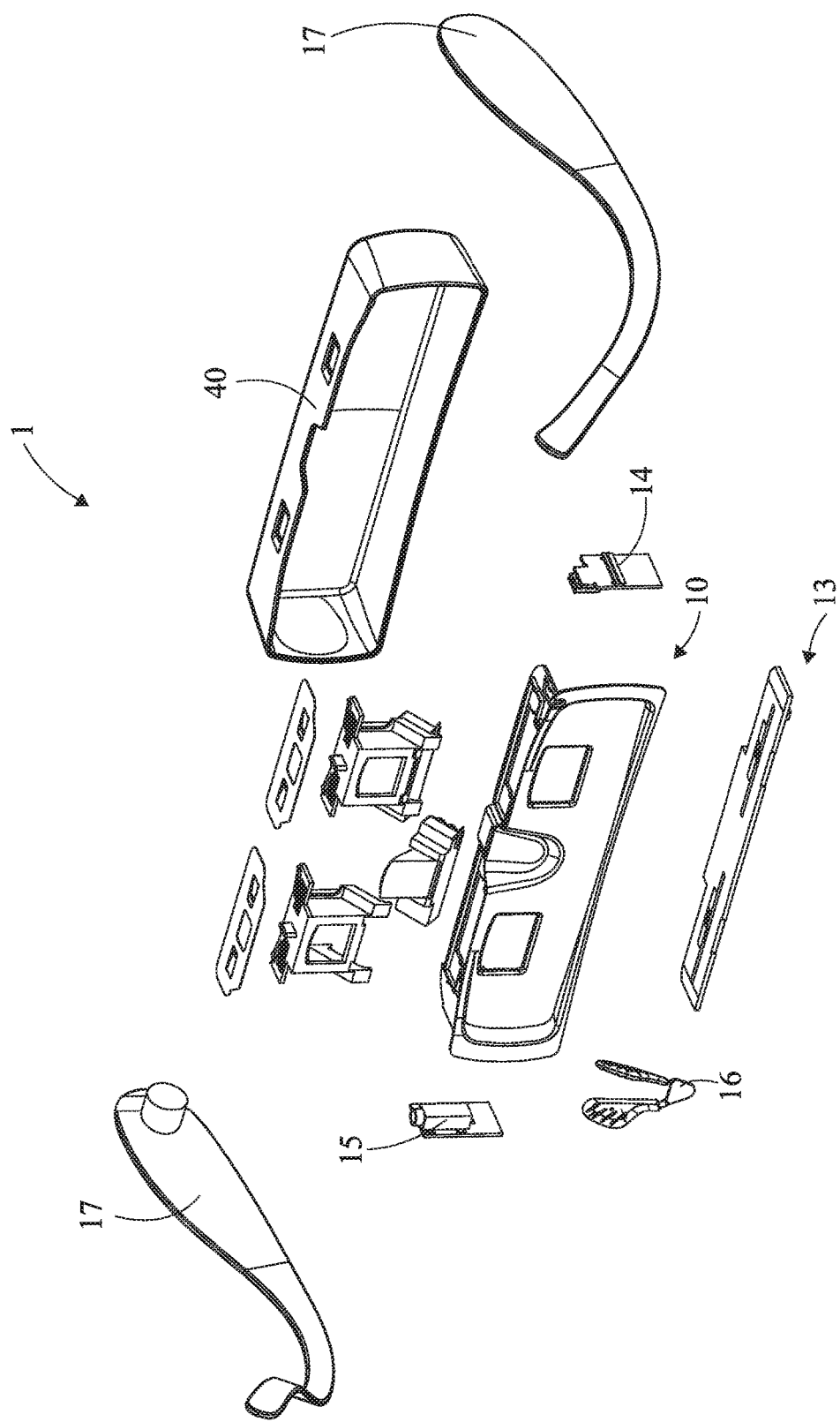
FIG. 1 is an exploded view of a preferred embodiment of the present invention.
Figure 2:
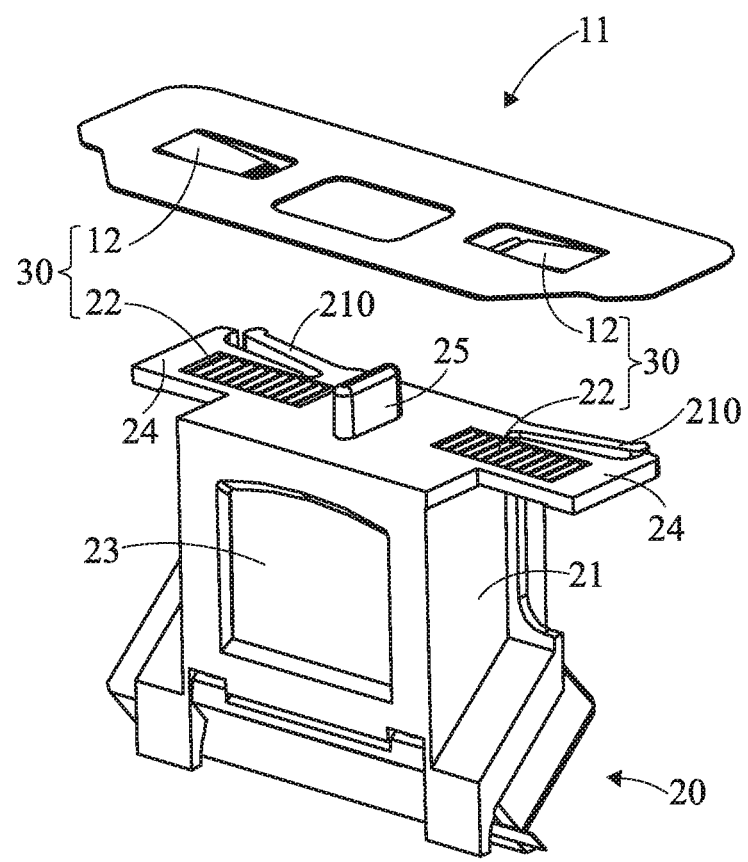
FIG. 2 is an exploded view of a first cover and a display module according to the preferred embodiment of the present invention.
Figure 3:
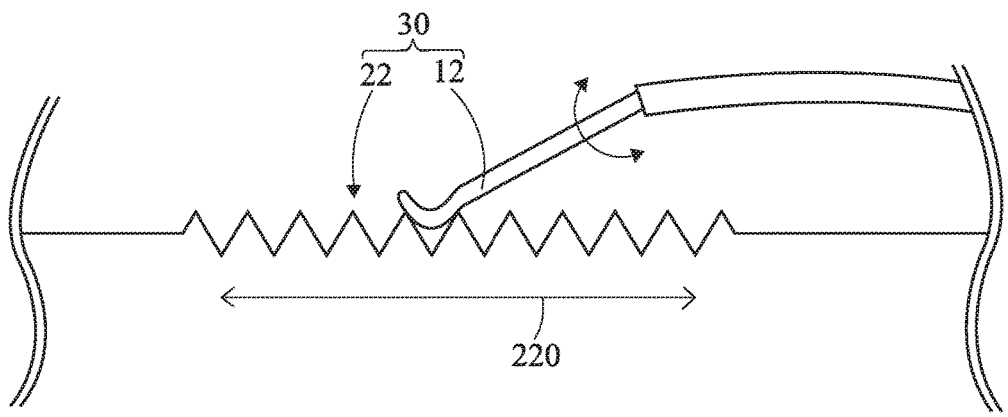
FIG. 3 is a schematic view illustrating a usage state of an snap-fit portion and a positioning structure according to the preferred embodiment of the present invention.
Figure 4:
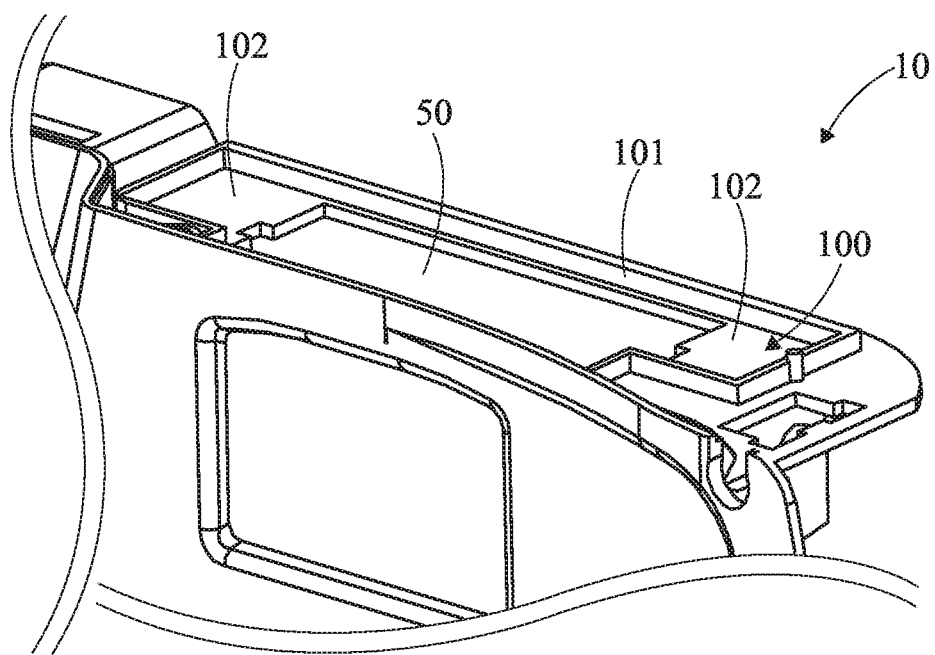
FIG. 4 is a partially enlarged view of a visual frame according to the preferred embodiment of the present invention.
Figure 5:
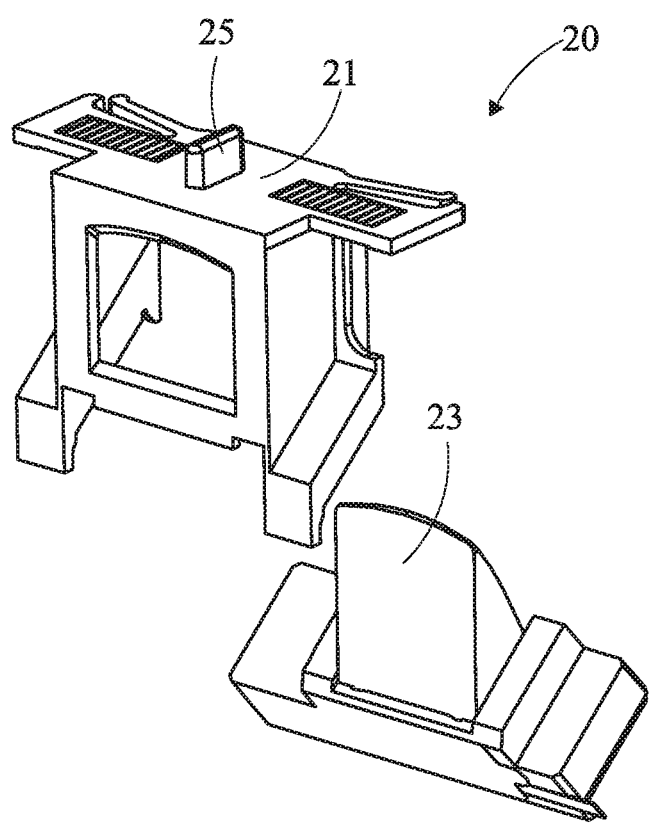
FIG. 5 is an exploded view of a display module according to the preferred embodiment of the present invention.
Figure 6:
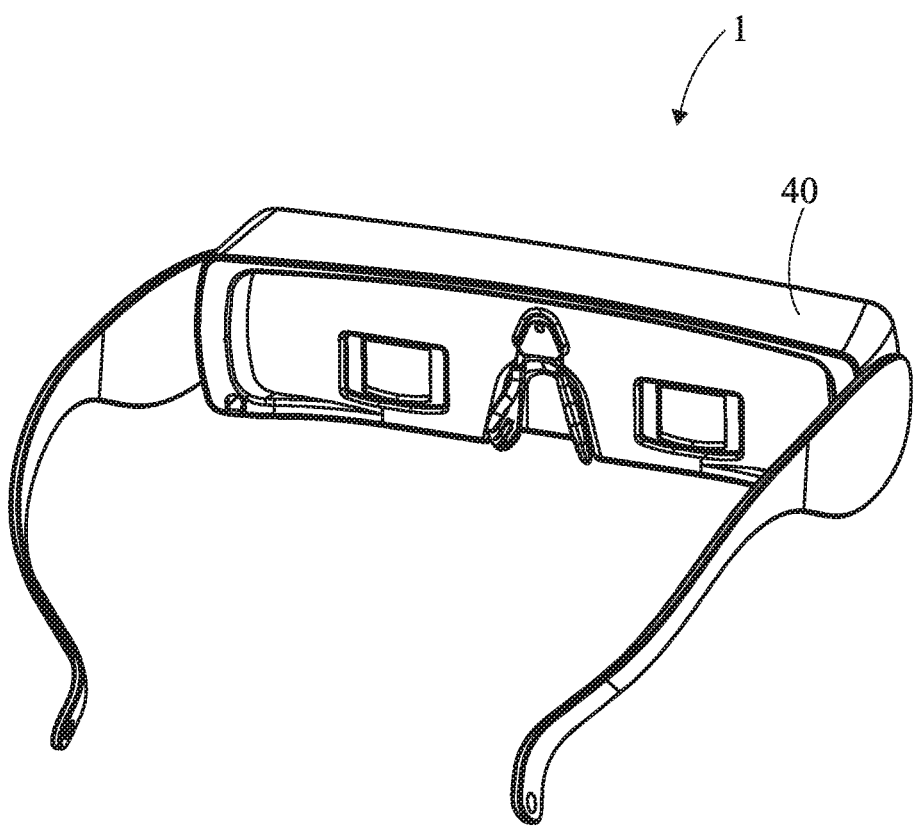
FIG. 6 is a perspective view of the preferred embodiment according to the present invention.

As shown in FIG. 1 to FIG. 6, the present invention provides a binocular head-mounted device 1 with interpupillary distance adjustment mechanisms 30, which comprises a visual frame 10, two display modules 20 and two interpupillary distance adjustment mechanisms 30.

In this embodiment, the head-mounted device 1 is of an immersive type, with the two display modules 20 being disposed at the left side and the right side of the visual frame 10 respectively. Each of the display modules 20 is formed by assembling a display frame 21 and a display unit 23 together (e.g., through bolting), and the two display units 23 correspond to the user's two eyes respectively to project an image into the user's two eyes. If the head-mounted device is of a see-through type in other embodiments, external light may be transmitted into the user's eyes via the display units. It can be understood that, the head-mounted device 1 further comprises a driving board module 13 for transmitting image signals to each of the display units 23. Furthermore, an external device may transmit the image signals to the driving board module 13 via an image transmission port 14 (e.g., an HDMI port).

Each of the interpupillary distance adjustment mechanisms 30 is disposed on one of the display modules 20 and on the visual frame 10, and has a snap-fit portion 12 and a positioning structure 22 corresponding thereto. Furthermore, each of the positioning structures 22 is disposed on one of the display modules 20, and the two snap-fit portions 12 are disposed at the left side and the right side of the visual frame 10 respectively. In other embodiments, it is also possible that the snap-fit portions are disposed on the display modules and the positioning structures are disposed on the visual frame.

Besides, each of the positioning structures 22 has a plurality of positioning recesses arranged along a first direction 220. When either of the display modules 20 moves parallel to the first direction 220 (leftwards or rightwards), the corresponding positioning structure 22 forces the corresponding snap-fit portion 12 to swing up and down, and when the display module 20 stops, the snap-fit portion 12 is snap-fitted into one of the positioning recesses. In this way, with the plurality of positioning recesses, the movement distance of each of the display modules 20 can be controlled. To prevent each of the snap-fit portions 12 from being stuck in one of the positioning recesses, the abutted surface of the snap-fit portion 12 and/or the abutted surface of the corresponding positioning recess shall be inclined. Each of the snap-fit portions 12 is an elastic member in order to be forced by the positioning structure 22 to swing when the display module 20 moves.

In this embodiment, each of the positioning structures 22 is a wavy structure formed by a plurality of the positioning recesses arranged continuously, and the wavy structure is of a triangular (sawtooth) waveform (e.g., an isosceles triangular waveform); and in other embodiments, the wavy structure may be of a sinuous waveform or other appropriate repeated waveforms. It can be appreciated that, each of the positioning recesses may also be formed by two protrusions adjacent to each other.

The visual frame 10 is provided with two first covers 11, which are positioned on the visual frame 10 (through, for example, bolting, adhesion or snap-fitting). The display modules 20 corresponding to the left eye and the right eye respectively can move leftwards and rightwards in the horizontal direction independently with respect to the first covers 11. Each of the snap-fit portions 12 is disposed on one of the first covers 11, and each of the first covers 11 is an independent member; and in other embodiments, the first covers located at the left side and the right side respectively may be connected integrally. In this embodiment, each of the snap-fit portions 12 comprises two first elastic members, each of the display modules 20 is provided, at a left side and a right side thereof respectively, with a plurality of the positioning recesses corresponding to one of the first elastic members, each of the first elastic members extends obliquely from one of the first covers 11 towards one of the positioning structures 22 to abut against one of the positioning recesses. Moreover, the two first elastic members of the same first cover 11 extend toward each other. When each of the display modules 20 moves, each of the first elastic members swings relative to the corresponding one of the first covers 11.

The visual frame 10 is further formed with two rails 100 located at the left side and the right side respectively, and each of the display modules 20 is limited in one of the rails 100. Each of the rails 100 comprises two vertical walls 101 parallel to the first direction 220 and two horizontal walls 102 connecting to the two vertical walls. Each of the display modules 20 abuts against the two vertical walls 101 so that the display module 20 can only move parallel to the first direction 220. Each of the display modules 20 has two wing plates 24 at the left side and the right side thereof respectively. The visual frame 10 is further provided with two first covers 11, and each of the wing plates 24 is sandwiched between one of the first covers 11 and one of the horizontal walls 102 to support the display module 20.

Each of the display modules 20 has at least one second elastic member 210 that extends from the display module 20 horizontally and obliquely, and the second elastic member 210 abuts against one of the vertical walls 101 so that the display module 20 can stably move along the rail 100. In this embodiment, each of the display modules 20 has two second elastic members 210 at the left side and the right side thereof respectively. In other embodiment, the display module may have one second elastic member.

The head-mounted device 1 of this embodiment further comprises a second cover 40 that covers the visual frame 10 to protect internal components therein. Each of the display modules 20 further has a convex portion 41, and each of the convex portions 41 is exposed outside through the second cover 40 to facilitate adjustment in position of the display module 20 by the user. Furthermore, two accommodation spaces 50 are enclosed by the second cover 40 and the visual frame 10, the two display modules 20 are disposed inside the accommodation spaces 50 respectively, and each of the rails 100 of the visual frame 10 is disposed at a bottom opening of the corresponding accommodation space 50.

The visual frame 10 is further provided with a sound source part 15 to transmit a sound signal. The visual frame 10 further comprises a nose pad component 16 and two glasses legs 17 so that the head-mounted device 1 can be worn just like a pair of glasses.

What is claimed is:

1. A binocular head-mounted device with interpupillary distance adjustment mechanisms, comprising: a visual frame; two display modules, disposed at a left side and a right side of the visual frame respectively; and two interpupillary distance adjustment mechanisms, wherein each of the interpupillary distance adjustment mechanisms is disposed on one of the display modules and on the visual frame and has a snap-fit portion and a positioning structure corresponding thereto, the positioning structure has a plurality of positioning recesses arranged horizontally in a first direction; wherein when either of the display modules moves parallel to the first direction, the corresponding positioning structure forces the corresponding snap-fit portion to move up and down, and when the display modules stops, the snap-fit portion is snap-fitted into one of the positioning recesses; and the visual frame is further formed with two rails, and each of the display modules is limited in one of the rails by an elastic member extending from the display module horizontally.

2. The binocular head-mounted device with interpupillary distance adjustment mechanisms of claim 1, wherein the positioning structure is a wavy structure formed by the plurality of positioning recesses continuously arranged.

3. The binocular head-mounted device with interpupillary distance adjustment mechanisms of claim 2, wherein the wavy structure is of a triangular (sawtooth) waveform.

4. The binocular head-mounted device with interpupillary distance adjustment mechanisms of claim 1, wherein each of the positioning recesses is formed of two protrusions adjacent to each other.

5. The binocular head-mounted device with interpupillary distance adjustment mechanisms of claim 1, wherein each of the positioning structures is disposed on one of the display modules, and the two snap-fit portions are disposed at the left side and the right side of the visual frame respectively.

6. The binocular head-mounted device with interpupillary distance adjustment mechanisms of claim 5, wherein the visual frame is provided with two first covers and each of the snap-fit portions is disposed on one of the first covers.

7. The binocular head-mounted device with interpupillary distance adjustment mechanisms of claim 6, wherein the two first covers are connected integrally.

8. The binocular head-mounted device with interpupillary distance adjustment mechanisms of claim 5, wherein each of the snap-fit portions comprises two first elastic members, and each of the display modules is provided, at a left side and a right side thereof respectively, with a plurality of the positioning recesses corresponding to one of the first elastic members.

9. The binocular head-mounted device with interpupillary distance adjustment mechanisms of claim 8, wherein the visual frame is provided with two first covers, each of the snap-fit portions is disposed on one of the first covers, each of the first elastic members extends obliquely from one of the first covers towards one of the positioning structures to abut against one of the positioning recesses, and when each of the display modules moves, each of the first elastic members swings relative to the corresponding one of the first covers.

10. The binocular head-mounted device with interpupillary distance adjustment mechanisms of claim 1, wherein each of the rails further comprises two horizontal walls, each of the display modules has two wing plates at a left side and a right side thereof respectively, the visual frame is further provided with two first covers, and each of the wing plates is sandwiched between one of the first covers and one of the horizontal walls.

11. The binocular head-mounted device with interpupillary distance adjustment mechanisms of claim 1, further comprising a second cover that covers the visual frame.

12. The binocular head-mounted device with interpupillary distance adjustment mechanisms of claim 11, wherein each of the display modules further has a convex portion, and each of the convex portions is exposed outside through the second cover so that each of the display module is moved by a user's hand.

13. The binocular head-mounted device with interpupillary distance adjustment mechanisms of claim 1, wherein each of the display modules is formed by assembling a display frame and a display unit together.

\* \* \* \* \*